United States Patent [19]

Payne

[11] Patent Number: 4,956,133
[45] Date of Patent: Sep. 11, 1990

[54] CONTINUOUS MOLDING APPARATUS AND METHOD

[76] Inventor: Le Roy Payne, 3300 Nicholas La., Molt, Mont. 59057

[21] Appl. No.: 271,686

[22] Filed: Nov. 16, 1988

Related U.S. Application Data

[60] Continuation-in-part of Ser. No. 202,267, Jun. 6, 1988, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.$^5$ ................ B29C 41/06; B29C 41/52; B29C 67/20
[52] U.S. Cl. .................... 264/39; 264/40.7; 264/45.3; 264/45.5; 264/45.7; 264/46.5; 264/51; 264/297.8; 264/310; 264/311; 425/145; 425/150; 425/216; 425/225; 425/435; 425/817 R
[58] Field of Search ............ 264/45.5, 37, 40.1, 264/40.7, 39, 45.3, 45.7, 46.5, 51, 297.1, 297.8, 310, 311; 425/4 R, 145, 146, 150, 216, 225, 226, 435, 543, 817 R

[56] References Cited

U.S. PATENT DOCUMENTS

| | | |
|---|---|---|
| 3,052,927 | 9/1962 | Hoppe et al. ............... 264/45.5 X |
| 3,843,285 | 10/1974 | Nitta et al. ..................... 425/4 R |
| 4,043,721 | 8/1977 | Lemelson ................... 425/4 R X |
| 4,051,209 | 9/1977 | Tabler .......................... 264/39 |
| 4,150,074 | 4/1979 | Tilgner ........................ 264/40.7 |
| 4,265,972 | 5/1981 | Rudner ..................... 264/45.5 X |
| 4,285,903 | 8/1981 | Lemelson ..................... 264/310 |
| 4,397,797 | 8/1983 | Nojiri et al. .................. 264/45.5 |
| 4,640,150 | 2/1987 | Kobayashi et al. ......... 264/45.5 X |

FOREIGN PATENT DOCUMENTS 1906276 9/1970 Fed. Rep. of Germany ..... 264/45.7
57-208222 12/1982 Japan ................... 264/45.7
2034239 6/1980 United Kingdom ............ 264/45.7

Primary Examiner—Jeffery Thurlow
Assistant Examiner—Leo B. Tentoni
Attorney, Agent, or Firm—Arthur L. Urban

[57] ABSTRACT

Continuous molding apparatus includes a raw material supplying portion, a molding portion, a supporting portion, a mixing portion and a control portion. Each reservoir of the raw material supplying portion is connected independently with the mixing portion. The molding portion includes a plurality of spaced mold assemblies each with at least two separable mold sections. The supporting portion includes a plurality of the spaced mold assemblies each supported for independent rotation about more than one axis. The mixing portion includes an elongated mixing chamber disposed adjacent each mold assembly each with a plurality of deflector sections. A continuous method of molding a foamed product includes providing a plurality of raw material reservoirs and continuously moving raw material from each reservoir independently to a plurality of spaced mixing chambers each of which is located adjacent to an individual mold assembly including separable mold sections. The raw materials are introduced into the mixing chambers and pass a freshly formed mixture flowing therefrom directly into a cavity of the adjacent mold assembly. Each mold assembly is rotated about more than one axis to flow the mixture over all surfaces of the mold cavity. The rotational movement of the mold assembly is continued while the mixture forms a foam. The delivery of raw materials to each mixing chamber and the mixture forming therefrom and the multiple axis rotation of each mold assembly is monitored. Also, the molded product produced by the method and apparatus.

30 Claims, 1 Drawing Sheet

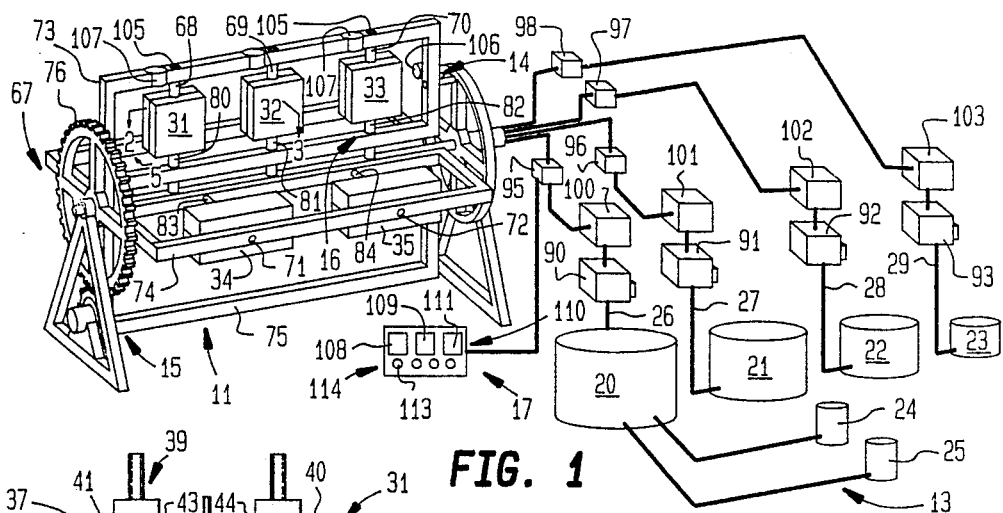
FIG. 1
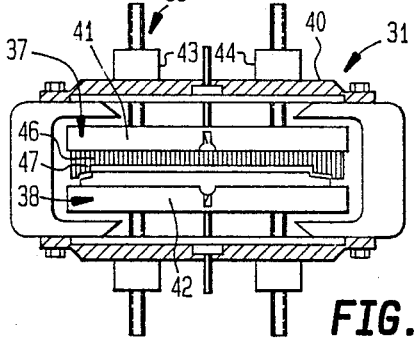
FIG. 2
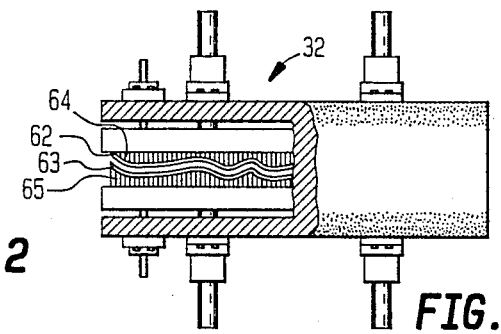
FIG. 3
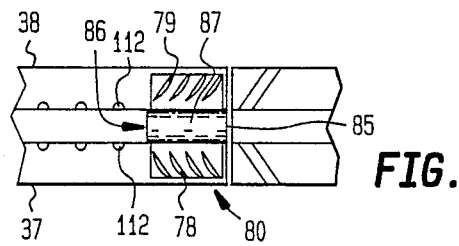
FIG. 5
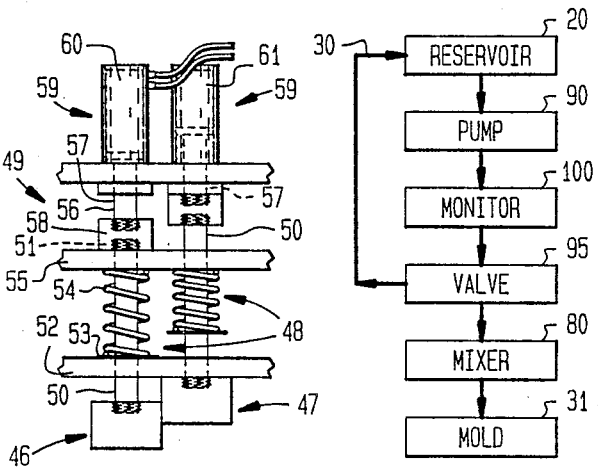
FIG. 4   FIG. 6
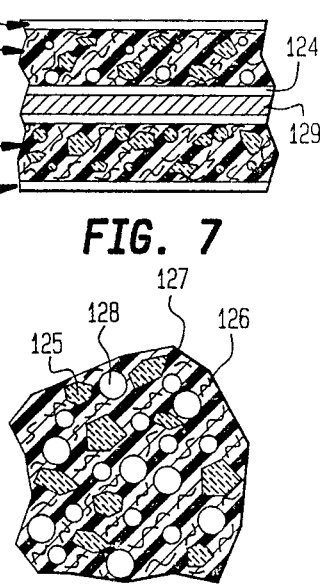
FIG. 7
FIG. 8

CONTINUOUS MOLDING APPARATUS AND METHOD

This application is a continuation-in-part of pending application Ser. No. 202,267, filed Jun. 6, 1988, which in turn is a continuation-in-part of application Ser. No. 890,742, filed Jul. 30, 1986, now U.S. Pat. No. 4,749,533, which is a division of application Ser. No. 766,498, filed Aug. 19, 1985, now U.S. Pat. No. 4,671,753.

BACKGROUND OF THE INVENTION

This invention relates to a novel molding apparatus and method and to the novel resulting molded product produced therefrom.

Throughout history, an important activity has been the construction of buildings for various purposes such as dwellings, storage and the like. With primitive societies, it was common to construct such buildings from natural materials that were readily available. In forested areas, structures were erected with logs or boards that had been cut from the logs.

Where trees were less common, people used stone for building materials or artificial adobe substitutes formed from mud baked in the sun. To make artificial stones or bricks more durable and less likely to crumble, it was customary to mix straw or similar materials with the mud. These are believed to be the first reinforced products.

As civilizations developed, the use of reinforced products has become much more common. For example, concrete is formed from mixtures of cement and aggregates such as sand, crushed stone, rocks, etc. In addition, for greater strength metal rods, mesh fabric and the like may be incorporated therein. Wood products of this type include plywood and similar laminated units as well as particle board, wafer board and the like.

With the discovery of man-made polymers and resinous materials, the use of fillers and reinforcing materials therein has become common. These materials may be in a variety of forms including particles, fibers, rods, fabrics and the like.

One of the major problems is the proper incorporation of the reinforcing and/or filler materials into the continuous phase or matrix. Unless a high degree of care is exercised when the materials are combined with the principal component, they may be distributed non-uniformly and/or voids, bubbles and other weak spots may be created.

Even with fillers and reinforcing materials which can be properly placed within a matrix easily, there still is the problem of achieving uniformity of the composition of the matrix. For example, concrete mixes which include cement, water and an aggregate can become non-homogeneous simply by settling on standing. As a result, the trucks which deliver such mixes include drums that are rotated continuously in an attempt to maintain uniformity.

This problem of non-uniformity is significant in most batch processes. Although the obvious solution to the shortcomings of batch processes is continuous processing, most products still are produced on a batch or unit basis even though it might be a continuous batch process, that is, individual units or batches are fabricated on an assembly line.

Examples of widespread batch processing are found in the construction industry. Buildings commonly are constructed on the site. Materials such as wood, bricks, metal beams, etc. are brought to the building site and assembled. A few components such as windows, doors, etc. may be assembled at another site. Although some manufactured housing is pre-fabricated in modules and trucked to the site for assembly, the fabrication work of such components probably still is accomplished on a unit by unit basis. As a result, reproducable high quality remains a serious problem.

The production of man-made plastics and resins is an industry that utilizes a high degree of continuous processing. However, for units of appreciable size, batch processing still is the rule rather than the exception. For example, in the production of fiberglass structures such as boats, it is customary to construct the hulls by hand, building on an open mold in which a plurality of resin and fiberglass layers are sequentially laminated or a plurality of mixed resin/chopped fiber coatings are applied over the mold.

Such hand built products require a large amount of labor and supervision to insure that a reasonable level of quality is achieved. This greatly increases the cost of the product.

The problems of batch processing become more complicated when the resins or polymers are foam-forming. As a multi-component mixture is placed into an open mold, the first part of the mixture begins to foam and grow from the bottom of the mold as a result of an exothermic chemical reaction. The bubble size of the foam is smallest at the bottom where the reaction begins and is largest at the top of the mold as the reaction draws to completion. The resulting product is non-uniform in density from top to bottom and thus has poor structural strength and is unsatisfactory.

In view of the above discussion, it is clear that present manufacturing and fabricating methods and procedures do not provide the operating efficiencies and design possibilities required currently and in the future. Thus, there is a need for a new fabrication method and apparatus which provide a high degree of quality and uniformity at a relatively low cost.

SUMMARY OF THE INVENTION

The present invention provides a novel continuous molding apparatus and method which not only overcome the deficiencies of present technology but also provide features and advantages not found in earlier expedients. The continuous molding apparatus and method of the invention provide a novel uniform quality product continuously and at low cost.

The continuous molding apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The apparatus and method of the invention can be modified to mold a wide variety of new structures. Variations both in product composition and configuration can be attained simply and quickly with the apparatus and method of the invention. Even with such variations, uniformity and quality of product dimensions and composition are still maintained without difficulty.

BRIEF DESCRIPTION OF THE DRAWINGS

These and other benefits and advantages of the novel continuous molding apparatus, method and product of the present invention will be apparent from the following description and the accompanying drawings in which:

FIG. 1 is a view in perspective of one form of continuous molding apparatus of the invention;

FIG. 2 is an enlarged sectional view of one form of mold assembly of the molding apparatus shown in FIG. 1 taken along line 2—2 thereof;

FIG. 3 is an enlarged view partially in section of another mold assembly of the molding apparatus shown in FIG. 1 taken along line 3—3 thereof;

FIG. 4 is a further enlarged fragmentary side view of the mold assembly shown in FIG. 2;

FIG. 5 is an enlarged fragmentary sectional view of one form of mixing portion of the molding apparatus shown in FIG. 1 taken along line 5—5 thereof;

FIG. 6 is a schematic illustration of one form of control portion of the molding apparatus of the invention;

FIG. 7 is an enlarged fragmentary cross-sectional view of a molded product of the invention; and FIG. 8 is a further enlarged fragmentary cross-sectional view of the molded product of the invention shown in FIG. 7.

DESCRIPTION OF THE PREFERRED EMBODIMENTS

As shown in the drawings, one form of continuous molding apparatus 11 of the present invention includes a raw material supplying portion 13, a molding portion 14, a supporting portion 15, a mixing portion 16 and a control portion 17.

The raw material supplying portion 13 of the molding apparatus 11 of the invention includes a plurality of reservoirs 20, 21, 22, 23, 24 and 25. These reservoirs may include storage chambers for resin-forming materials, fillers, reinforcements, colors, catalysts, foam-forming materials, other additives, inert mixtures thereof and the like. Reservoirs 24 and 25 are connected with reservoir 20 for premixing of inert materials therein prior to transfer to the mixing portion.

Reservoirs 20-23 of the raw material supplying portion 13 are independently connected to the mixing portion 16 through conduit means 26, 27, 28 and 29. Advantageously, separate bypass return conduit means 30 extend from one end of each conduit 26-29 adjacent the mixing portion back to the respective reservoir 20-23 as illustrated in FIG. 6.

The molding portion 14 of the molding apparatus 11 includes a plurality of spaced mold assemblies 31, 32, 33, 34 and 35. Each of the mold assemblies includes at least two separable mold sections shown for mold assembly 31 as mold sections 37 and 38. The molding portion also includes mold section orienting means 39. The means 39 advantageously includes a frame assembly 40 and mold section holding members 41 and 42. Preferably, the mold section orienting means includes mechanisms such as pressurized fluid activating means shown as pistons 43 and 44.

The mold sections of the mold assemblies 31-35 advantageously include a plurality of closely spaced movable mold segment members 46 and 47 providing changes in the configuration of the mold cavity formed by the mold sections. As shown in FIG. 4, one form of the mold segment members is actuated through a rod assembly 49 that includes a first rod 50 extending outwardly from the mold segment member 46 through a first stop section 52. On the opposite side of first stop section from the mold segment member 46, coil spring 48 is disposed on the first rod. The spring has one end 53 affixed to rod 50 along its length and an opposite free end 54 that bears against a second stop section 55 spaced from the first stop section 52.

An end 51 of rod 50 remote from the mold segment member is operatively connected to an end 56 of a second axially aligned movable rod 57 through a connector 58. Rod 57 is a part of actuating means 59 which may include a piston/cylinder combination 60 or a solenoid 61 as shown with adjacent mold segment member 47. The operation of the actuating means 59 advantageously is coordinated through the control portion 17.

FIG. 3 illustrates continuous flexible cavity liners 62 and 63 disposed over the outer faces of the assembly of mold segment members 64 and 65 similar to members 46 and 47 described above. This construction provides a smooth cavity surface without abrupt changes. The flexible liners preferably are formed of a resilient material such as a silicone polymer, a fluorinated ethylene polymer and the like.

Advantageously, greater adaptability can be achieved with mold segment members that are replaceable easily such as by threading them off or onto the respective rod. In this way, the same mold assemblies 31-35 can be utilized to mold a wide variety of different molded products simply and quickly with a minimum of downtime. Thus, the productive capacity and operating efficiency of the apparatus 11 are superior to conventional molding apparatus that require the fabrication of a completely new mold assembly for each change in the product being molded.

The supporting portion 15 of the molding apparatus 11 of the present invention includes a common rotatable frame section 67 for a plurality of spaced mold assemblies. Support means 68, 69, 70 and 71 are spaced along the supporting portion for independent rotation of each mold assembly about more than one axis.

Advantageously, mold assemblies are disposed on the supporting portion 15 generally parallel to one another with adjacent ends thereof in the same general transverse plane. The rotational capability of the mold assemblies preferably is about axes generally perpendicular to one another. The frame section 67 advantageously is rotatable about a horizontal axis. The supporting portion preferably includes a plurality of frame sections 73, 74, 75 and 76 rotatable about separate axes jointly rotatable about a common axis as shown in FIG. 1.

The mixing portion 16 of the molding apparatus 11 includes an elongated mixing chamber disposed adjacent each mold assembly. A plurality of deflector sections 78 and 79 are disposed within each mixing chamber and spaced along the length thereof. As shown in FIG. 1, mixing chambers 80-84 advantageously are located at the inlet 85 of each mold assembly 31-35. Preferably, the mixing chambers of the mixing portion are integrally formed with the mold assemblies as shown in FIG. 5.

The deflector sections 78 and 79 disposed within the mixing chambers 80-84 advantageously are angled with respect to a longitudinal axis of a mixing chamber. Preferably, the deflector sections are movable selectively to a position outside the mixing chamber. It is advantageous that the mixing portion include cleaning means 86 movable into a mixing chamber when the deflector sections are outside the mixing chamber. Preferably, the cleaning means includes a piston member 87 that is inserted into the mixing chamber. For complex mold designs including one or more elongated and/or tortuous areas, it is desirable that the mold assemblies include more than one inlet for controllable delivery of the moldable mixture into different zones of the mold cavity.

The control portion 17 of the molding apparatus 11 of the present invention includes a plurality of pumps, valves, sensors, monitors and the like. Advantageously, a pump 90, 91, 92 or 93, a valve 95, 96, 97 or 98, and a flow monitor 100, 101, 102 or 103 are located along the length of each conduit 26-29 that extends between the raw material reservoirs 20-23 and the mixing chambers 80-84.

Also, the control portion includes a plurality of drive means. A first drive 105 provides rotation of each mold assembly 31-35. A second drive 106 provides rotation of the frame section 67 therefor along a second axis. A third drive 107 provides movement of the mold orienting means 39.

The control portion 17 further includes programmable memory means 108 and actuating means 109 responsive thereto, advantageously in combination with coordinating means 110 to control the operation of the pumps, valves and drives. Preferably, the coordinating means includes a process controller 111 that initiates changes in the flows of materials and speeds of drives to bring variations therein back to the rates specified in the programs present in the memory 108.

This coordination commonly is achieved through the transmission of information such as digital pulses from the monitors and/or sensors at the control components to the process controller. The operating information is compared with the preselected programming parameters stored in the memory. If differences are detected, instructions from the controller change the operation of the components to restore the molding operation to the preselected processing specifications.

The drive means of the control portion preferably include electrical motors. The control portion advantageously also includes means 112 in the mold assemblies monitoring the flow distribution within the mold cavities.

Novel molded products of the present invention may be formed using the molding apparatus 11 shown in the drawings employing the following steps of the molding method of the invention. With the design of the desired molded product established, the control portion 17 including memory 108 which may be a computer, is programmed with the necessary processing parameters for the particular product being molded.

The molding portion 14 is prepared to provide a mold cavity with the desired configuration. This can be accomplished by fabricating the required mold sections in the conventional manner. More advantageously, the control portion 17 can form the mold cavity configuration by activating the appropriate actuating means 59 and thereby moving the mold segment members 46 and 47 into positions providing the desired mold cavity configuration. In this way, the configuration is created simply and quickly without removing the mold sections or mold assembly from the molding apparatus 11 so downtime is greatly reduced.

To start the operation of the molding apparatus 11, buttons and/or switches 113 of a control panel 114 are depressed to activate the memory 108 and the other components of the control portion 17. The coordinating means 110 energizes the third drive 107 for actuating the mold orienting means 39 to lock the mold sections together and the first drive 105 for rotation of each mold assembly 31-35.

Also, the pumps 90-93, the valves 95-98 and the flow monitors 100-103 are energized by the coordinating means 110 in the preselected sequences of the program stored in the memory. This causes the raw materials in reservoirs 20-23 to advance along the conduits 26-29 toward the mixing portion 16. For example, to mold a product including a foamed polyurethane resin, reservoir 20 may contain a previously prepared mixture of an isocyanate and gravel as a filler, reservoir 21 a polyol, 22 carbon dioxide foam forming materials (and 23 and other reservoirs)—(not shown) colors, catalysts, etc. as required.

To produce high quality molded products of the invention, it is important that the raw materials delivered to the mixing chambers 80-84 be uniform in volume and composition. This can be facilitated by providing a continuous flow of raw materials to the mixing portion and the immediate transfer of the mixture therefrom into the mold cavities. However, the volume of the mixture delivered into the mold cavities will vary depending upon the particular incremental area of the cavity being coated at any instant. Also, the delivery will be terminated completely when a molded product is being removed from the mold assembly.

Advantageously, as shown in FIG. 6, a separate bypass conduit 30 is utilized from the end of each conduit 26-29 at a point adjacent each mixing chamber 80-84 back to the respective reservoir 20-23. This construction in combination with control portion 17 diverts raw material to its reservoir prior to entering the mixing chambers while comparing the flow rates of the raw materials with preselected values. When the flow rates are substantially the same as the preselected values, the control portion passes the raw materials continuously into the mixing chambers. In this way, a freshly formed uniform mixture is passed into the mold cavities even though the distance is considerable between the reservoirs and the individual mixing chambers which are located closely adjacent or even within the mold assemblies.

The control portion 17 coordinates the operation of the various system components so the required formulation can flow into the desired zones within the rotating mold cavity. With the molding apparatus 11 as shown in FIG. 1, the formulation is introduced into the mold cavity while the axis of the mold assembly is in the orientation shown, that is, radial of the central horizontal axis of the apparatus.

When the desired volume of the mixture has passed into the mold cavity, the deflector sections 78 and 79 are withdrawn from the mixing chamber. Then, the piston member 87 moves forward into the mixing chamber pushing any liquid mixture remaining therein into the mold cavity and cleaning the mixing chamber for the molding of the next product. With the piston 87 disposed in the mixing chamber, rotation of the secondary frame sections 73-76 is begun while continuing the rotation about the transverse axis to flow the mixture over all surfaces of the mold cavity.

The rotations are controlled within the parameters stored in the memory 108. For particular molded products, the rotations about the respective axes may be continuous and/or intermittent at changing rates. Also, it may be desirable to provide arcuate rotation, that is, movement about an arc such as a rocking motion. Advantageously, monitors 112 within the mold assemblies inform the process controller when the mixture has flowed over all surfaces of the mold cavity.

The components of the liquid mixture that flows over the mold interior quickly begin to react to form the thermosetting resin structure while rotational movement of the mold assembly continues. The mixture initially spread over the mold interior forms a resin coating with a high density with little or no bubble formation. As the reaction rate increases due to the exothermic reaction of the resin formation, the foam formed decreases in density.

The foam density decreases substantially uniformly as the spacing from the mold cavity surfaces increases. This decrease in density continues until the foams that are expanding toward each other meet. At these boundaries, a thin high density central barrier is formed.

The rotation of the mold assembly is stopped and pistons 43, 44 are actuated to separate the mold sections 37 and 38 and free the molded product therefrom. The separated molded product is set aside to complete the foam formation and/or the curing of the resin therein. During this period, the final expansion of the foam, free of the mold's restraint, stresses the high density outer skin or layer of the product. This stressing of the skin increases the strength and puncture resistance thereof and also the structural strength of the molded product itself. The structural strength of the product can be enhanced further by including a reinforcement such as metal or fiberglass fibers in the mixture prior to molding. Also, preformed reinforcements 129 e.g. metal rods can be positioned in the mold cavity before the mold sections are closed.

FIG. 7 illustrates an enlarged cross-sectional view of a molded product of the invention produced employing the molding apparatus and method described above. FIG. 8 illustrates a further enlarged fragment of FIG. 7. As shown, the product includes high density stressed outer layers 120 and 121 with less dense layers 122 and 123 extending inwardly therefrom to a thin high density central barrier 124. Filler particles 125 and fiber reinforcements 126 are distributed throughout the product. Resin matrix 127 surrounds individual filler particles 125, fiber reinforcements 126 and gas bubbles 128.

Advantageously, the stressed outer layers 120 and 121 include a somewhat greater concentration of hard filler particles and the foamed layers 123 and 124 include a somewhat greater concentration of the fiber reinforcement. Thus, the present invention provides a novel molded product that is a unitary structure with integral hard outer surfaces over a more flexural strong core and includes high proportions of fillers and/or reinforcements.

The above description and the accompanying drawings show that the present invention provides a novel molding apparatus, method and product which not only overcome the deficiencies and shortcomings of earlier expedients, but also provide novel features and advantages not found in previous products, methods and apparatus. The molding method and apparatus of the invention produce continuously a novel product with close tolerances of composition, strength and appearance at a significantly lower cost than competitive products.

The continuous molding apparatus of the invention is simple in design and relatively inexpensive. Commercially available materials and components can be utilized in the fabrication of the molding apparatus using conventional metal working techniques and procedures.

Products can be produced efficiently with the apparatus and method by operators with limited experience and aptitude after a short period of instruction. The apparatus is durable in construction and has a long useful life with a minimum of maintenance.

The apparatus and method of the invention can be utilized to mold a wide variety of different products. Variations in composition, structure and surface appearance of the products can be achieved simply and quickly with the method and apparatus of the invention.

It will be apparent that various modifications can be made in the particular continuous molding apparatus and method and the products produced thereby as described in detail above and shown in the drawings within the scope of the present invention. The size, configuration and arrangement of components and materials can be changed to meet specific requirements. For example, the number of components and reservoirs may be different. In addition, the mold assemblies can be heated and/or cooled to control the rates at which reactions and foaming take place therein. Also, the apparatus may include other drive and actuating components and mechanisms.

These and other changes can be made in the continuous molding apparatus, method and products provided the functioning and operation thereof are not adversely affected. Therefore, the scope of the present invention is to be limited only by the following claims.

What is claimed is:

1. Continuous molding apparatus including a raw material supplying portion, a molding portion, a supporting portion, a mixing portion and a control portion; said raw material supplying portion including a plurality of reservoirs, said reservoirs being connected independently with said mixing portion through conduit means; said molding portion including a plurality of spaced enclosed mold assemblies, each of said mold assemblies including at least two separable mold sections and mold section orienting means; said supporting portion including a common rotatable frame section for a plurality of said spaced mold assemblies, support means spaced along said supporting portion for independent rotation of each mold assembly about at least two axis in a preselected rotational profile, said raw material conduit means being disposed adjacent at least a part of said frame section and communicating with each mold assembly; said mixing portion including an elongated mixing chamber disposed adjacent each mold assembly, a plurality of deflector sections within each mixing chamber spaced along the length thereof; said control portion including pump means, valve means and flow monitoring means disposed along each raw material conduit means, independent drive means for each mold assembly, for said frame section therefor, and for said mold orienting means; programmable memory means and actuating means responsive thereto respectively controlling and activating said pump means, said valve means and said drive means.

2. Continuous molding apparatus according to claim 1 wherein said raw material supplying portion includes separate bypass return conduit means from one end of each of said conduit means adjacent said mixing portion back to the respective reservoir.

3. Continuous molding apparatus according to claim 1 wherein said raw material conduit means communicate with said mixing chambers through said rotatable support means.

4. Continuous molding apparatus according to claim 1 wherein said mold assemblies are disposed generally parallel to one another with adjacent ends thereof in the same general transverse plane.

5. Continuous molding apparatus according to claim 1 wherein said rotational capability of said mold assemblies is about axes generally perpendicular to one another.

6. Continuous molding apparatus according to claim 1 wherein said mold sections of said mold assemblies include a plurality of closely spaced mold segment members providing changes in said mold cavity.

7. Continuous molding apparatus according to claim 1 wherein said mold sections of said mold assemblies include flexible cavity liners including a plurality of closely spaced mold segment members bearing against said liners providing changes in said mold cavity.

8. Continuous molding apparatus according to claim 1 wherein said mold section orienting means includes pressurized fluid activating means.

9. Continuous molding apparatus according to claim 1 wherein said frame section is rotatable about a horizontal axis.

10. Continuous molding apparatus according to claim 1 wherein said supporting portion includes a plurality of frame sections rotatable about separate axes jointly rotatable about a common central axis.

11. Continuous molding apparatus according to claim 1 wherein said elongated mixing chambers of said mixing portion are integrally formed with said mold assemblies.

12. Continuous molding apparatus according to claim 1 wherein said deflector sections of said mixing portion are angled with respect to a longitudinal axis of each elongated mixing chamber.

13. Continuous molding apparatus according to claim 1 wherein said deflector sections are movable selectively to a position outside said mixing chambers.

14. Continuous molding apparatus according to claim 13 including cleaning means movable into said mixing chamber when said deflector sections are outside said chamber.

15. Continuous molding apparatus according to claim 14 wherein said cleaning means includes a piston member.

16. Continuous molding apparatus according to claim 1 wherein said control portion includes coordinating means for said memory means and said pump means, said valve means, said flow monitoring means and said drive means.

17. Continuous molding apparatus according to claim 1 wherein said drive means of said control portion includes electrical motors.

18. Continuous molding apparatus according to claim 1 wherein said drive means of said control portion includes pressurized fluid motors.

19. Continuous molding apparatus according to claim 1 wherein said control portion includes monitors within said mold assemblies.

20. A continuous molding method including the steps of providing a plurality of raw material reservoirs, continuously moving raw material from each reservoir independently to a plurality of spaced mixing chambers each of which is located adjacent to an individual enclosed mold assembly including separable mold sections, introducing raw materials into said mixing chambers, passing a freshly formed mixture flowing from each mixing chamber directly into an enclosed cavity of said adjacent mold assembly in a preselected flow rate profile, rotating each mold assembly about at least two intersecting axes in a preselected rotational profile, flowing said mixture over all surfaces of said mold cavity by said rotational movement, continuing said rotational movement of said mold assembly while said mixture forms a foam completely filling said cavity thereof; monitoring the delivery of raw materials to each mixing chamber, the resulting mixture flowing therefrom and the multiple axis rotation of each mold assembly, separating said mold sections of each mold assembly after said foam has formed within said mold cavity, removing a molded foamed product from said separated mold sections, closing said mold sections and repeating said steps to form a multiplicity of such molded products on a continuing basis.

21. A continuous molding method according to claim 20 including disposing said mold assemblies substantially parallel to one another.

22. A continuous molding method according to claim 20 including diverting raw material to its respective reservoir prior to entering said mixing chambers, comparing the flow rates of the raw materials with preselected values and passing the raw materials continuously into said mixing chambers when the flow rates are substantially the same as the preselected values.

23. A continuous molding method according to claim 20 including coordinating and controlling the steps of the method automatically.

24. A continuous molding method according to claim 20 including rotating the mold assemblies about axes generally perpendicular to one another.

25. A continuous molding method according to claim 20 including introducing a resin-forming component into said mixing chamber.

26. A continuous molding method according to claim 20 including introducing a particulate filler into said mixing chamber.

27. A continuous molding method according to claim 20 including introducing a fiber reinforcement into said mixing chamber.

28. A continuous molding method according to claim 20 including introducing a foam forming component into said mixing chamber.

29. A continuous molding method according to claim 28 including introducing a carbon dioxide foam forming component into said mixing chamber.

30. A continuous molding method according to claim 20 including cleaning said mixing chambers prior to repeating the method.

* * * * *